May 3, 1955     E. WALKER     2,707,351
PLANT SUPPORTING AND TRANSPORTING STAND
Filed Oct. 22, 1951
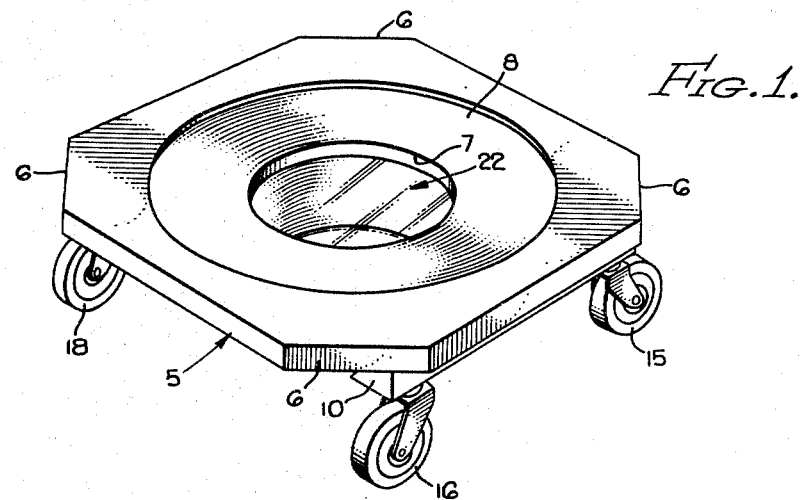
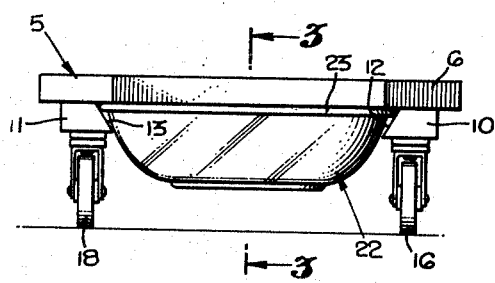
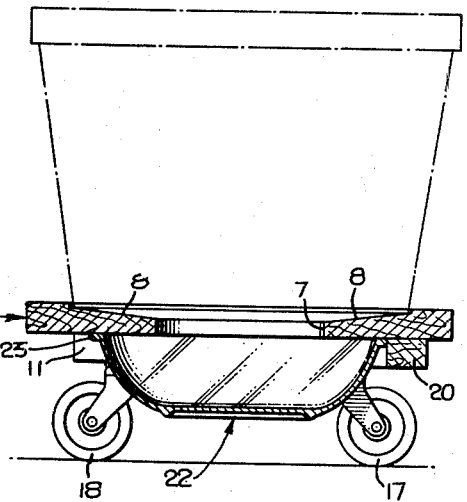
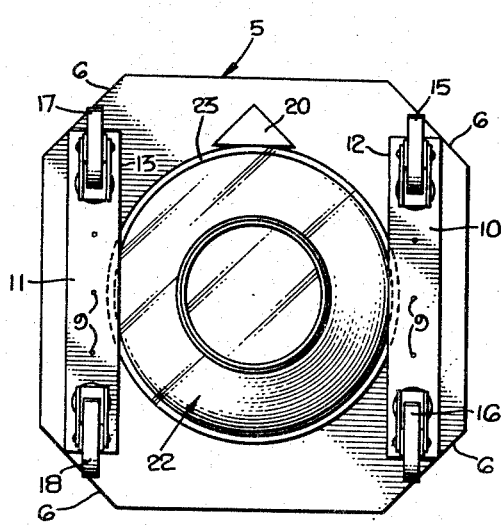
ETHEL WALKER
INVENTOR.
BY
ATTORNEY

United States Patent Office 2,707,351
Patented May 3, 1955

2,707,351

PLANT SUPPORTING AND TRANSPORTING STAND

Ethel Walker, Hollywood, Calif.

Application October 22, 1951, Serial No. 252,519

1 Claim. (Cl. 47—39)

This invention relates to stands, and particularly to a supporting and transporting stand for plants in tubs and pots.

Plant stands of the general type of this invention are known, reference being made to U. S. Patent No. 1,820,843 of August 25, 1931. The present stand, however, has been found to provide several advantages over previously known stands from the standpoints of economy in manufacture, flexibility to tubs and pots of various sizes, appearance, and in function. That is, the top platform is a single plate or piece of material, which provides the stand with strength diagonally across the stand. The single plate, the caster wheels, the two strips to which the caster wheels are attached and which support the drip pan, constitute the entire structure. These elements may be quickly assembled, the entire unit being light in weight and easily transported from place to place.

Another feature is the form of the top plate or platform. This plate has an opening through which water drains to the drip pan, and water from holes in the bottoms of different sized tubs and pots is directed to the opening by an annular taper of the surface surrounding the opening. Thus, different sized tubs and pots may be accommodated by the stand.

The principal object of the invention, therefore, is to facilitate the supporting and transporting of plants in tubs and pots.

Another object of the invention is to provide an improved stand for plants in tubs and pots.

A further object of the invention is to provide an improved supporting and transporting stand for plants.

Although the novel features which are believed to be characteristic of this invention will be pointed out with particularity in the appended claim, the manner of its organization and the mode of its operation will be better understood by referring to the following description, read in conjunction with the accompanying drawings, forming a part hereof, in which:

Fig. 1 is a perspective view of a stand embodying the invention.

Fig. 2 is an elevational view of the stand embodying the invention.

Fig. 3 is a cross-sectional view of the stand taken along the line 3—3 of Fig. 2 and showing in dot and dash lines a plant tub or pot in position thereon, and Fig. 4 is a bottom view of the stand embodying the invention.

Referring now to the drawings, in which the same numerals identify like elements, the principal element of the stand is the top plate or platform 5, which is substantially square in shape with the corners removed as shown at 6 to permit easier maneuvering. The plate 5 has an opening 7 therein at the center thereof, and a large portion of the surface of the plate is tapered as shown at 8 toward opening 7 to conduct water dripping from the holes in the bottoms of tubs and pots to the opening 7.

To the bottom of plate 5 is attached by nails or screws, as shown at 9, or any other suitable manner, two strips 10 and 11, which have beveled sides 12 and 13, respectively. At or adjacent the ends of the strips 10 and 11, are attached in the usual manner four caster wheels 15, 16, 17, and 18 with their respective supporting assemblies. Between one pair of ends of strips 10 and 11, is a stop member 20.

The above elements complete the stand, to which is now added a drip pan 22 having a rim 23. The pan is slid along the beveled sides 12 and 13 of strips 10 and 11 to the stop member 20, the rim 23 being supported by the strips.

This type of stand described above may be made of wood, metal, or plastic, while plastic is preferred for the pan 20 and casters 15, 16, 17, and 18. When the platform is of wood, the strips 10 and 11 are attached across the grain thereof. A water-proof finish may be given to the wood. This construction provides an air space under the tubs and pots, while the pan 20 may be removed and replaced easily without disturbing the plants. With ball bearing casters, especially heavy tubs and pots may be easily moved about over thick rugs and in patios.

I claim:

A plant tub or pot supporting and transporting stand comprising a substantially rectangular unitary top platform, said platform being made of one piece and having a circular central opening therein, the major and annular portion of the surface of said platform between the edge of said opening and the edges of said platform being tapered toward said opening, the surface of said taper at its larger diameter being below the surface of said platform defining a shouldered recess for seating a flowerpot, a pair of parallel strip members attached to the underside of said platform and adjacent parallel edges thereof, said members having sharply tapered sides facing each other, a caster wheel adjacent each of the ends of said strip members, a rimmed pan under said opening slidable along and in contact with said tapered sides of said strip members for supporting said pan, and a stop member for said pan attached to the underside of said platform between a pair of adjacent ends of said strip members.

References Cited in the file of this patent

UNITED STATES PATENTS

| | | |
|---|---|---|
| 426,287 | Larkin | Apr. 22, 1890 |
| 902,737 | Jones | Nov. 3, 1908 |
| 1,182,670 | Fountain | May 9, 1916 |
| 1,204,431 | Haddock | Nov. 14, 1916 |
| 1,455,255 | Kapelman | May 15, 1923 |
| 1,808,402 | Cooper | June 2, 1931 |
| 1,820,843 | Spitz | Aug. 25, 1931 |
| 2,022,591 | Everitt | Nov. 26, 1935 |